July 24, 1956 W. V. SMITH 2,755,600
APPARATUS FOR SHARPENING A LAWN MOWER
Filed July 23, 1952 4 Sheets-Sheet 1
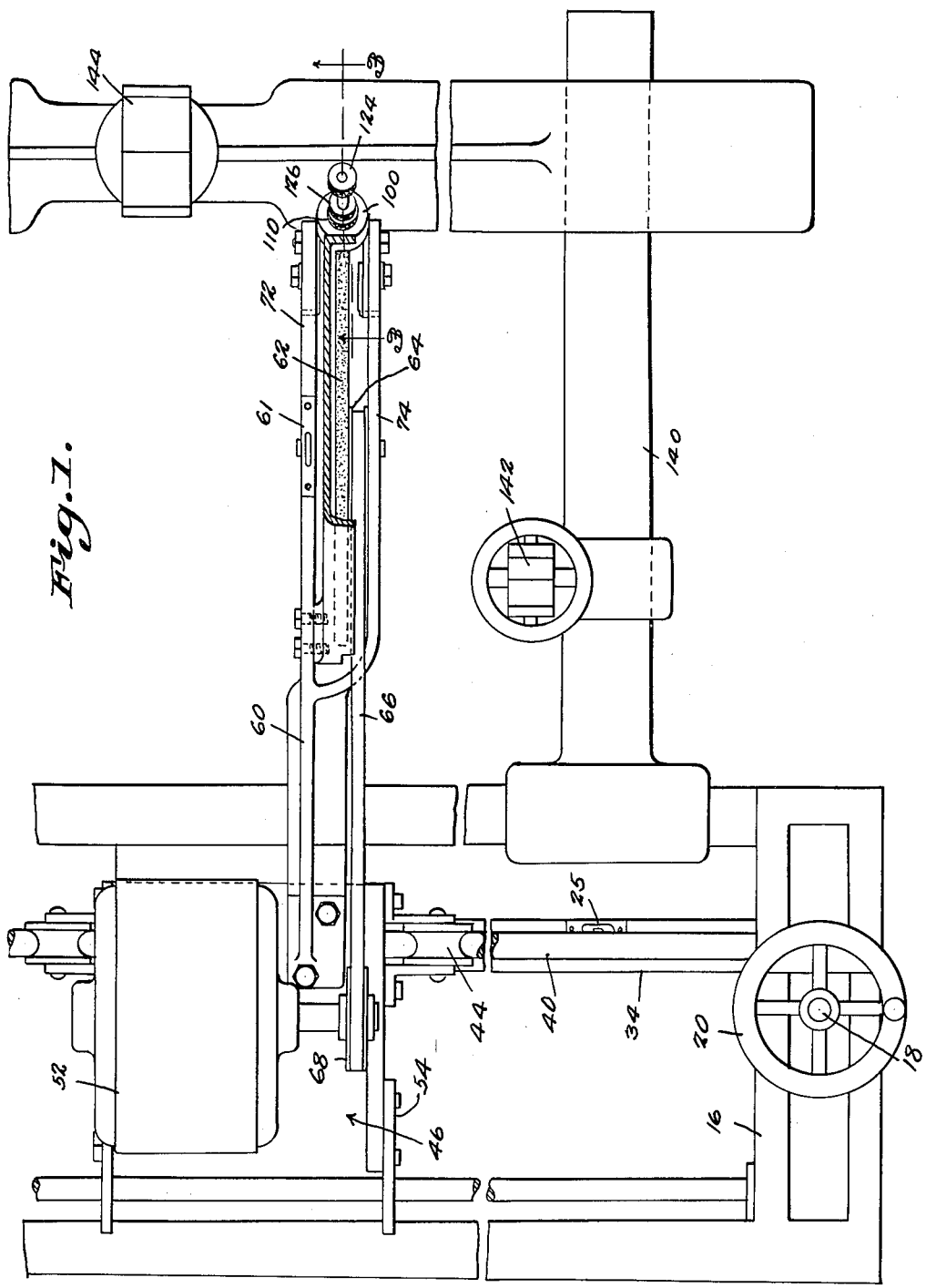
W. V. Smith INVENTOR
BY C. Snowles
ATTORNEYS.

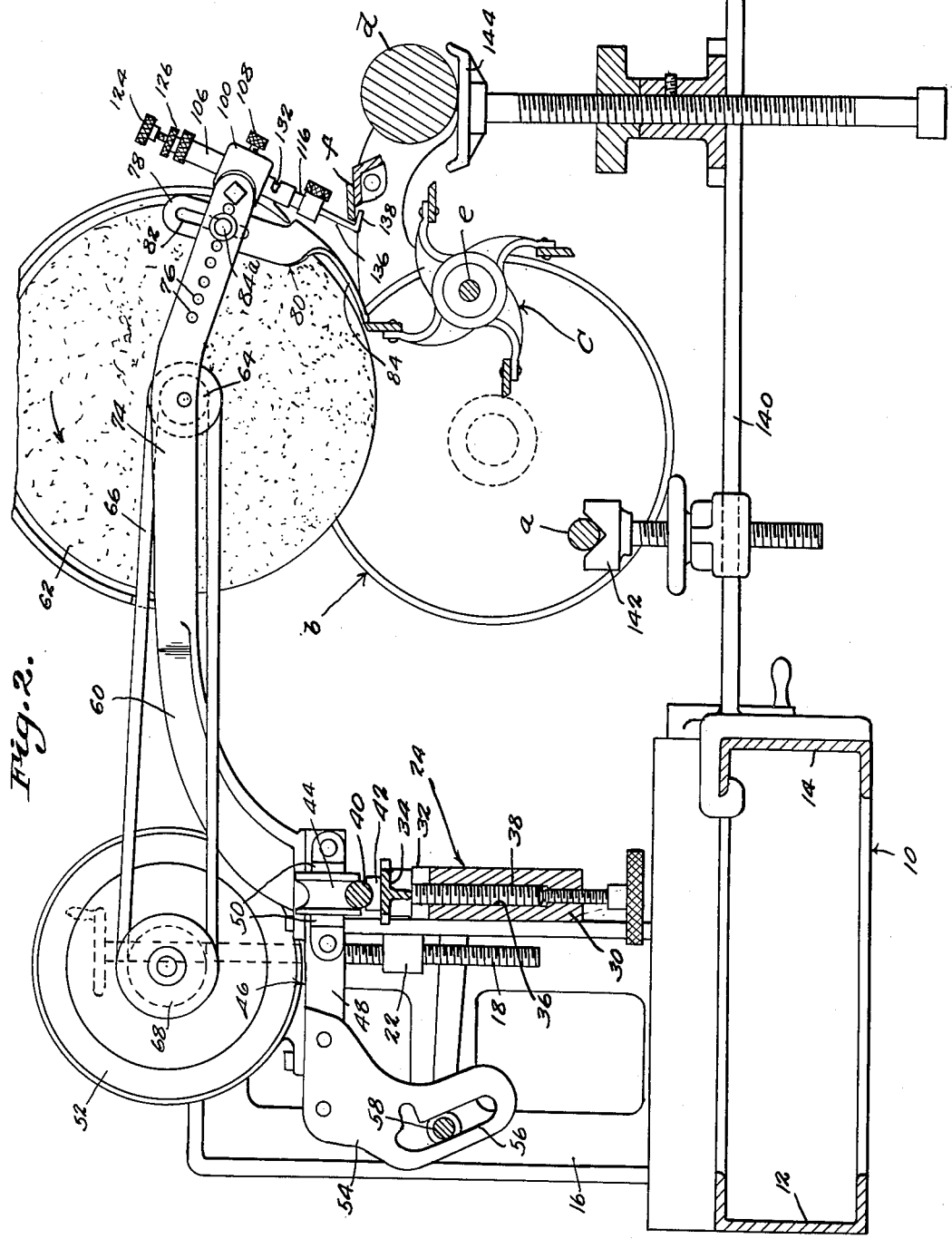

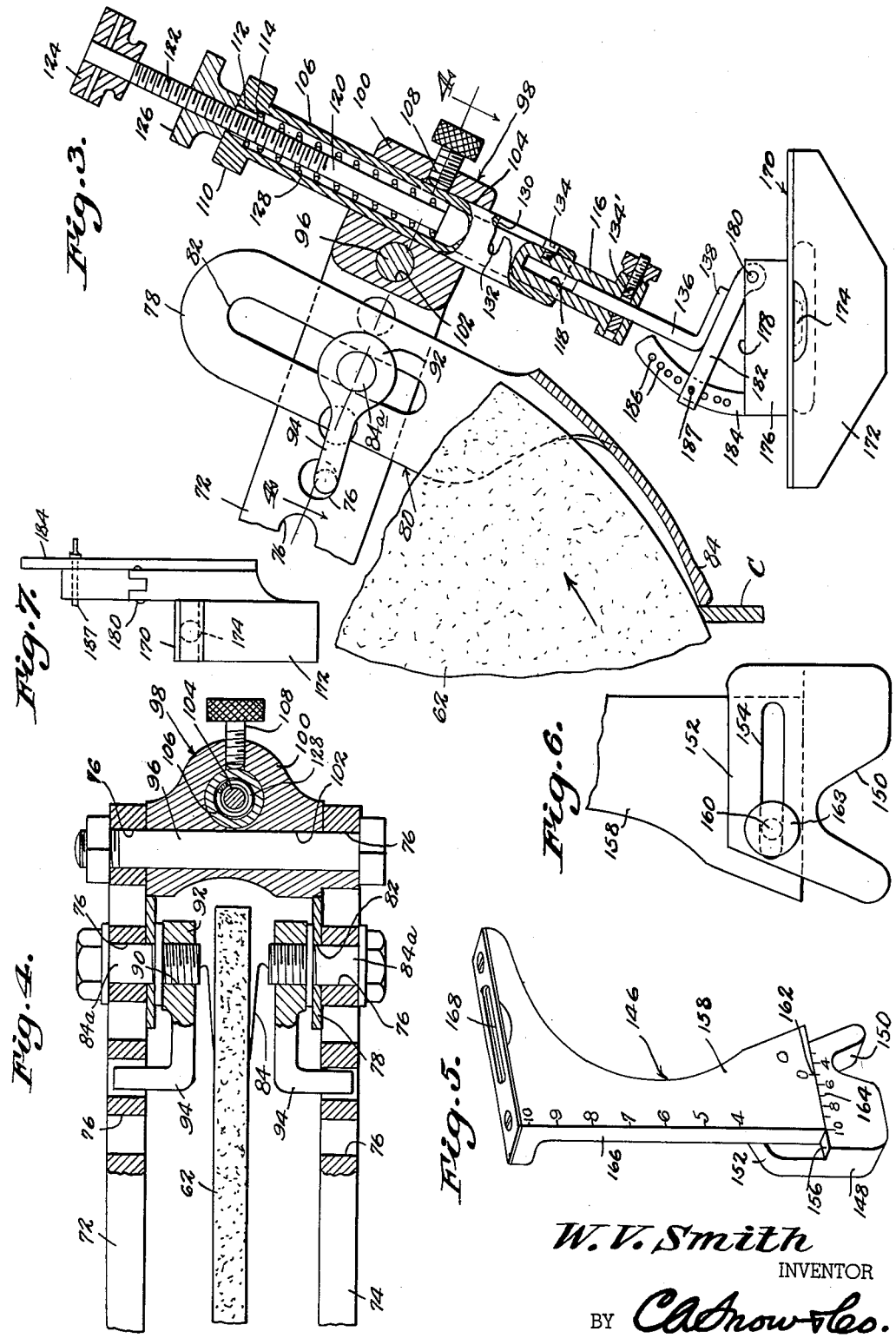

July 24, 1956 W. V. SMITH 2,755,600
APPARATUS FOR SHARPENING A LAWN MOWER
Filed July 23, 1952 4 Sheets-Sheet 4
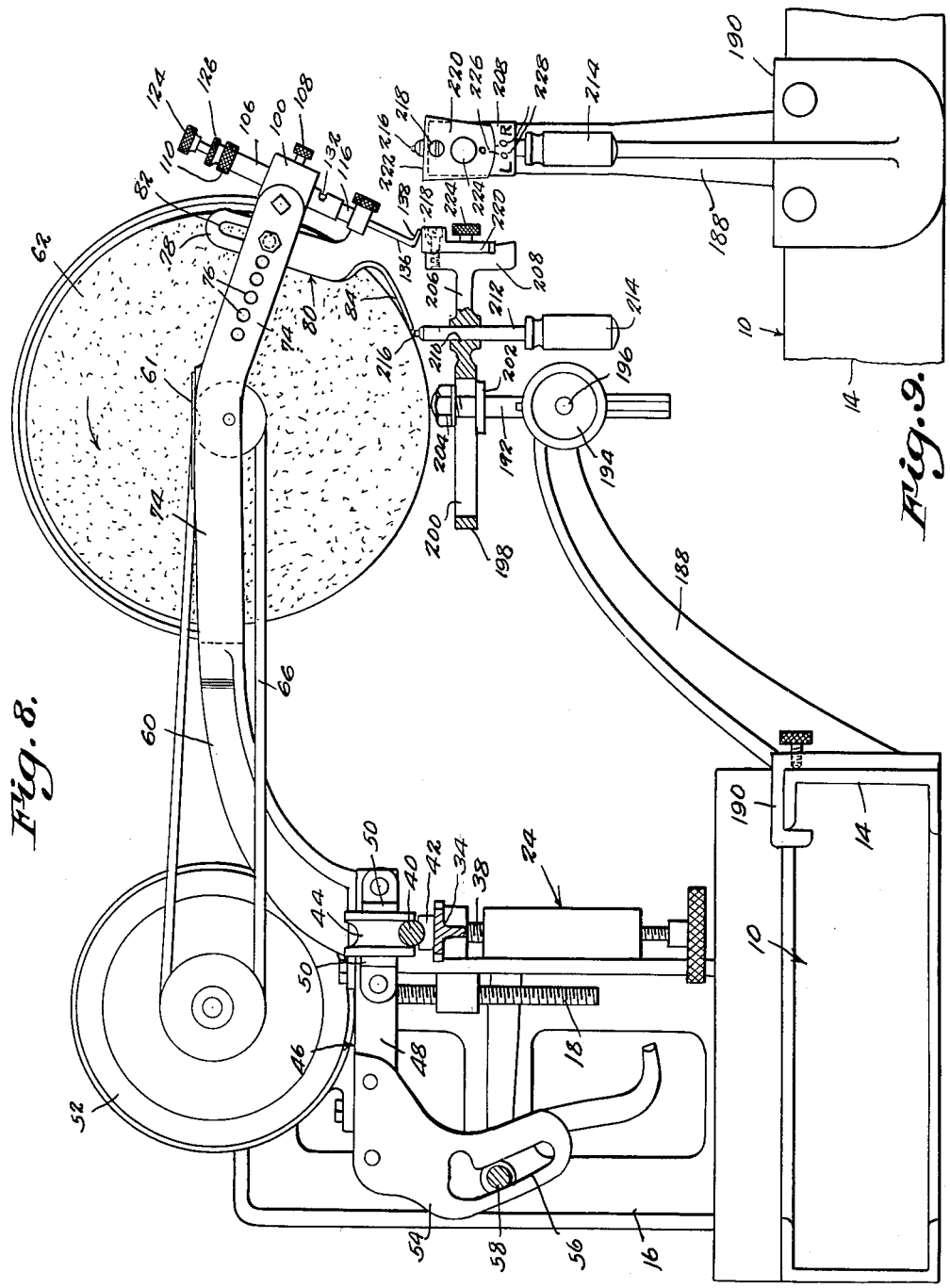
W. V. Smith
INVENTOR
BY C. A. Snow & Co.
ATTORNEYS.

United States Patent Office 2,755,600
Patented July 24, 1956

2,755,600

APPARATUS FOR SHARPENING A LAWN MOWER

William V. Smith, Greenville, Ill.

Application July 23, 1952, Serial No. 300,406

2 Claims. (Cl. 51—48)

This invention relates to sharpening lawn mowers and has for its primary object to facilitate the rapid mounting and adjustment of a lawn mower on a grinding machine.

Another object is to accurately adjust the grinding wheel of the lawn mower grinding machine to produce the correct angle on the cutting edge of a cutting blade for obtaining the maximum cutting efficiency when the lawn mower is in use.

Another object is to facilitate the dressing of the grinding wheel to enable it to properly grind the blades of either a right or left handed lawn mower reel.

The above and other objects may be attained by employing this invention which embodies among its features means for accurately positioning a grinding wheel above the reel of an inverted lawn mower mounted below said wheel, an anchoring hook carried by the grinding wheel and adapted to engage the cutter bar of the lawn mower, means for accurately locating the hook relative to the grinding wheel, and means for accurately locating a blade in a position beneath the grinding wheel to be engaged thereby for sharpening.

Other features include supporting a lawn mower in inverted position beneath the grinding wheel of a sharpening machine, accurately locating the blade of the reel of a lawn mower relative to the grinding wheel, and supporting the cutter bar of the lawn mower in a definite position relative to the grinding wheel.

In the drawings,

Fig. 1 is a fragmentary plan view of a grinding machine embodying the features of this invention, Fig. 2 is a side view of the machine illustrated in Fig. 1 showing a lawn mower mounted on the grinding machine in position to be engaged by the grinding wheel, Fig. 3 is a fragmentary enlarged sectional view taken substantially on the line 3—3 of Fig. 1, Fig. 4 is a fragmentary sectional view taken substantially along the line 4—4 of Fig. 3, Fig. 5 is a perspective view of the reel locating gauge, Fig. 6 is an enlarged fragmentary side view of the gauge illustrated in Fig. 5, Fig. 7 is an end view of another gauge, Fig. 8 is a view similar to Fig. 2 showing the grinding wheel dressing equipment, and Fig. 9 is an end view of the dressing equipment.

Referring to the drawings in detail a machine bed 10 comprising spaced parallel side bars 12 and 14 which are preferably of channel construction with their flanges extending toward one another has mounted thereon adjacent opposite ends longitudinally spaced pedestals 16 in which are mounted vertically extending screws 18 connected to hand wheels 20 by means of which the screws may be rotated about their vertical axes. Threadedly engaging the screws 18 are nuts 22 upon which a carriage designated generally 24 is mounted for vertical movement therewith. A spirit level 25 is carried by the carriage to assure accuracy in levelling the carriage.

The carriage 24 comprises a body 30 carrying adjacent opposite ends upwardly extending ears 32. A track supporting bar 34 is carried by and extends between the ears 32, and threadedly engaged with an internally screw threaded vertical socket 36 formed in the body 30 intermediate its ends is a screw 38, the upper end of which is adapted to engage the underside of the bar 34 to bow the bar between the ears 32. Entered at opposite ends in the ears 32 above the bar 34 is a track rail 40 which extends in spaced relation above and to the bar 34, and secured to the bar 34 midway between opposite ends and engaging the underside of the track rail is a lug 42 which when the bar is bowed by the screw 38 causes the track rail 40 to bow upwardly. The structure so far described is disclosed in my prior Patent No. 2,281,055 issued April 28, 1942, and forms no part of this invention except as combined with the elements about to be described.

Mounted for movement on longitudinally spaced rollers 44 which engage the track rail 40 is a carriage designated generally 46 which comprises a transversely extending platform 48 carrying on opposite sides laterally extending spaced ears 50 between which the rollers 44 are mounted to rotate about axes which lie perpendicular to the axis of the track rail 40. A suitable drive motor 52 is mounted on the platform 48 to one side of the track rail 40, and carried by the platform 48 and depending downwardly from opposite ends thereof are guard plates 54 having elongated slots 56 extending therethrough for the reception of a bar 58 which is carried by and extends between the pedestals 16 in spaced relation to the bed 10. Carried by and extending outwardly from the platform 48 above the side thereof remote from the motor 52 is an arm 60 adjacent the outer end of which is mounted for rotation a grinding wheel 62. A suitable drive pulley 64 is connected to the grinding wheel and has driven connection through the medium of a flexible belt 66 with the drive pulley 68 of the motor 52. The end of the arm 60 remote from that which is connected to the platform 48 is bifurcated as will be readily understood upon reference to Fig. 1 to provide separate arms 72 and 74 between which the grinding wheel 62 operates. The ends of the arms 72 and 74 remote from the carriage 46 turn downwardly and each is provided with a longitudinal row of longitudinally spaced openings 76 with the axes of the openings in opposite arms 72 and 74 aligning.

Spaced upwardly extending ears 78 are formed on a guard plate designated generally 80 and are provided with elongated longitudinal slots 82 for the reception of a bolt 84[a] which is adapted to be projected through aligned openings 76 to hold the guard plate 80 at a selected location on the arm 60 adjacent the periphery of the grinding wheel 62. A tongue 84 is carried by the guard plate 80 and extends downwardly adjacent the periphery of the grinding wheel 62 with its end engaging a blade of a lawn mower reel in order to cause the reel to turn as the grinding wheel traverses said reel during the grinding operation. The inner ends of the bolts 84[a] are threaded as will be readily understood upon reference to Fig. 4 for engagement with threaded openings 90 formed in nuts 92 which carry laterally extending hooks 94 for entrance into openings 76 near those through which the bolts 84[a] project.

Extending through the openings 76 nearest the outer ends of the arms 72 and 74 is a bolt 96 upon which is supported a socket member designated generally 98 which comprises a body 100 having spaced openings 102 and 104 extending therethrough along perpendicular axes. The opening 102 receives the bolt 96, and mounted for longitudinal sliding movement in the opening 104 is a sleeve 106 which is held in various adjusted positions in said opening by a set screw 108 which projects through the body 100 in threaded engagement therewith and impinges on the sleeve 106. As will be readily understood upon reference to Fig. 3, the upper end of the sleeve 106 is closed by a head 110 having an axial opening 112 extending therethrough which forms in conjunction with the longitudinal passage through the sleeve a shoulder 114, the purpose of which will hereinafter appear.

Mounted for longitudinal sliding movement in the sleeve 106 adjacent the end thereof remote from the head 110 is a plunger 116 having an axial recess 118 opening through the end thereof remote from the sleeve 106, and carried by the plunger 116 and extending longitudinally from the end thereof remote from the recess 118 is a stem 120 which projects through the opening 112 in the head 110 and is equipped with external screw threads 122. The end of the stem 120 remote from the plunger 116 carries a suitable knob 124 and threaded on the threads 122 of the stem 120 between the knob 124 and the head 110 is a thumb nut 126 which is adapted to bear on the head 110 to limit longitudinal movement of the plunger 116 through the end of the sleeve 106. A compression coil spring 128 encircles the stem 120 between the shoulder 114 and the plunger 116 to yieldingly urge the plunger 116 through the end of the sleeve 106. It will thus be understood that the thumb nut 126 operates against the effort of the spring 128 to restrict the movement of the plunger 116 under the influence of the spring 128. Formed in the sleeve 106 adjacent the end thereof through which the plunger 116 extends, is an elongated longitudinal slot 130 which communicates adjacent its end remote from the adjacent end of the sleeve 106 with a transversely extending slot 132. A laterally extending lug 134 is carried by the plunger 116 and extends through the slot 130 when the plunger is projected under the influence of the spring, but the lug 134 may be moved to hold the plunger 116 retracted against the effort of the spring by moving the knob 124 to move the lug 134 into the slot 132. A suitable clamp member 134' is carried by the plunger 116 for clamping engagement with the shank 136 of a hook 138 when the shank is entered into the recess 118. It will thus be seen that the hook 138 may be adjusted to various positions relative to the sleeve 106 by rotating the thumb nut 126, and the hook may also be retracted against the effort of the spring 128 and held in retracted position by engagement of the lug 134 with the walls of the slot 132.

In order to hold a lawn mower in inverted position beneath the grinding wheel 62, spaced arms 140 are detachably connected to the bed 10 as will be readily understood upon reference to Fig. 2 and project laterally from the bed 10 below the path of the grinding wheel 62 when the latter traverses the reel of the lawn mower. Mounted for vertical adjustment on each arm 140 adjacent the bed 10 of the grinding machine is a saddle member 142, and a seat 144 is mounted on the supporting arm 140 adjacent the end thereof remote from the bed frame 10.

The saddle 142 serves to engage the shrub bar $a$ of a lawn mower designated generally $b$ of the type having a reel designated generally $c$ and a ground roller $d$. The ground roller is adapted to be supported on the seat 144 as illustrated in Fig. 2 and by adjusting the seat 144 and the saddle member 142 vertically, the peripheral edges of the blades of the lawn mower reel $c$ may be moved into a position to be contacted by the periphery of the grinding wheel as it traverses the lawn mower.

The seat 144 is rotatably mounted on the end of an upstanding screw carried by the supporting arm 140 spaced from the saddle 142 and perpendicular to the arm and threadedly adjustable therewith.

In setting up a lawn mower to be sharpened in the machine, I employ a gauge designated generally 146 which comprises a base member 148 having a V-shaped notch 150 opening through its underside. The base member is provided adjacent one side with an upstanding flange 152 having an elongated slot 154 extending therethrough which lies parallel with the top of the base member 148. The junction of the base member 148 with the flange 152 forms a shoulder 156 which extends parallel to the slot 154, and mounted on the shoulder 156 for movement longitudinally of the base member and the slot 154 is an upwardly extending arm 158 carrying a laterally extending screw threaded stud 160 which projects through the slot 154 and is engaged by a nut 163 in order to clamp the arm 158 in a selected position on the gauge member. An index 162 is carried by the arm 158 and cooperates with a longitudinal row of indices 164 carried by the base member 148 in determining the position of the gauging edges 166 of the arm 158 with relation to the notch 150. In the preferred form of the invention the upper end of the arm 158 is provided with a spirit level 168 which lies perpendicular to the gauging edge 166 so that when the walls of the notch 150 engage the reel drive shaft $e$ of the lawn mower $b$ and the level 168 registers horizontal, the gauging face 166 of the arm 158 will lie vertical. By adjusting the arm 158 relative to the base 148 according to the indices 162 and 164, to show the diameter of the reel $c$ of the lawn mower, it will be evident that with the gauge placed as previously described, the upwardly extending blade of the lawn mower may be accurately positioned for engagement by the periphery of the grinding wheel 62.

In order to determine the proper angle of contact of the edge of the grinding wheel 62 with the outer periphery of the blades of the reel $c$ of the lawn mower, accurate adjustment of the angular position of the hook 138 is required. Accordingly I employ a gauge designated generally 170 which comprises an elongated body 172 carrying intermediate its ends a spirit level 174. Rising from the top edge of the body 172 is a block 176, the top surface 178 of which is accurately formed to lie horizontal when the spirit level so indicates. Pivotally connected at 180 to the block 176 adjacent one end thereof is an arm 182, and extending upwardly from the block 176 is a quadrant 184 having an arcuate row of spaced openings 186 extending therethrough. A bolt 187 is carried by the arm 182 for passage through a selected opening 186 in order to hold the arm at a definite angle with relation to the horizontal surface 178.

With the supporting arm 60 of the grinding wheel 62 leveled by the spirit level 61, the gauge 170 with the arm 182 at a selected angle relative to the spirit level 174 is employed so that the arm 182 engages the hook 138 and the body 100 is rocked about the bolt 96 until the spirit level 174 indicates a horizontal position. With the hook thus adjusted, the body 100 is locked in place.

With the hook 138 properly adjusted, it is engaged beneath the bed knife $f$ of the lawn mower $b$ as suggested in Fig. 2 in order to establish a definite relationship between the grinding wheel and reel blade to assure that the cutting edge of the upwardly extending blade of the reel will be ground at a selected angle for the best possible cutting efficiency.

It is well known that lawn mower reels are made so that the blades thereof will follow either a right hand or left hand spiral about the axis of the drive shaft of the lawn mower. It therefore becomes necessary to dress the peripheral edge of the grinding wheel 62 so that it lies at an angle to the axis of the grinding wheel. Accordingly I employ a supporting bracket 188 carrying a hook 190 for engagement over the side rail 14 of the bed 10 in order to support the bracket 188 beneath the arm 60 carrying the grinding wheel 62. Mounted for vertical sliding movement in the bracket arm 188 remote from the hook 190 is a post 192 which is held in a selected vertical position by the adjustment of a hand wheel 194 carried by the supporting bracket 188 and having a threaded stud 196 which when the wheel is turned impinges against the post 192 to hold it in a selected vertical position. Mounted for longitudinal sliding movement on the post 192 adjacent the upper end thereof is an elongated yoke 198 having an elongated slot 200 extending therethrough through which the post 192 projects. A stop 202 is carried by the post adjacent the upper end thereof upon which the yoke 198 is supported, and a clamp nut 204 is threadedly engaged with the post above the stop for clamping engagement with the yoke 198 to hold it in a selected position on the post. Carried by the yoke 198 and extending longitudinally from one end thereof is an arm 206 carrying at its end remote from the yoke 198 a head 208. The arm is provided intermediate its ends with a passage 210 for the reception of the shank 212 of a wheel dressing tool 214, carrying a dressing diamond 216 which is adapted to engage the periphery of the grinding wheel 62 adjacent the end of the guard 84 which engages the blade of the reel c of the lawn mower when the latter is being ground. Mounted on a pivot 218 carried by and extending outwardly from the head in parallel relation to the arm 206 but in a direction opposite from said arm is a guide block 220 having a top guiding surface 222 for engagement with the hook 138. A set screw 224 is carried by the guide block 220 for impingement against the head 208 to hold the guide block in adjusted position about its pivot 218. A suitable index mark 226 is carried by the guide block 220 for cooperation with indices 228 carried by the head which indicate when the guide block 220 is set to grind a right hand or left hand reel.

When a left handed reel is to be ground, the index 226 is moved to the left above the index 228 and adjacent the index L on the head 208 so that the guide surface 222 will be tilted as suggested in Fig. 8 and as the grinding wheel 62 is moved to traverse the diamond 216, its periphery will be dressed to a corresponding angle.

From the foregoing it will be obvious that the wheel 62 is first dressed to sharpen the edges of the blades of a lawn mower reel in accordance with whether the blades follow a right hand or left hand spiral about the axis of the reel. With the wheel thus dressed, the arm 188 is detached from the grinding machine and the lawn mower is inverted and placed on the supporting arms 140 as illustrated in Fig. 2. The positions of the various elements of the lawn mower are then adjusted so that the grinding wheel 62 engages an adjacent reel blade at the selected angle and as the grinding wheel is set into motion and traverses the length of the lawn mower reel c, the end of the shield or guard 84 will move the blade being ground as it follows the contour of the blade, the blade being pressed against said shield by the effort exerted on the edge thereof by the rotation of the grinding wheel.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. In a lawn mower sharpening machine of the type having a grinding wheel mounted to move in a path substantially parallel with its axis, a hook traversing the bed knife of a lawn mower guiding the grinding wheel during its movement, means for dressing the grinding wheel and preparing it to grind a reel having right hand or left hand spiral blades, said dressing means comprising a dressing tool mounted below the grinding wheel for engaging the periphery of the grinding wheel and dressing it, means carried by the dressing tool and engaging the hook for moving the grinding wheel away from the dressing tool as the grinding wheel moves in one direction in the path.

2. The structure defined in claim 1 in which the means for moving the grinding wheel from the dressing tool comprises an adjustable block carried by the dressing tool for tilting movement about an axis which lies perpendicular to the axis of the grinding wheel, and a face on the block for engagement by the hook.

References Cited in the file of this patent

UNITED STATES PATENTS

| | | |
|---|---|---|
| 101,477 | Littlefield | Apr. 5, 1870 |
| 363,988 | Carson | May 31, 1887 |
| 647,806 | Cleveland | Apr. 17, 1900 |
| 657,443 | Newton | Sept. 4, 1900 |
| 659,513 | Dubus | Oct. 9, 1900 |
| 1,063,342 | Ekman | June 3, 1913 |
| 1,628,116 | Cherry | May 10, 1927 |
| 2,055,361 | Oliver | Sept. 22, 1936 |
| 2,281,055 | Smith | Apr. 28, 1942 |
| 2,572,530 | Smith | Oct. 23, 1951 |
| 2,624,983 | Rink | Jan. 13, 1953 |